R. L. Fraser,
Snap Hook.
No. 96,418. Patented Nov. 2, 1869.

Witnesses.
Kate N. Jones
John A. Wiedersheim

Ralph L. Fraser
by J. Fraser & Co. attys.

United States Patent Office.

RALPH L. FRASER, OF WESTERNVILLE, NEW YORK.

Letters Patent No. 96,418, dated November 2, 1869.

IMPROVEMENT IN SNAP-HOOKS.

The Schedule referred to in these Letters Patent and making part of the same.

*To all whom it may concern:*

Be it known that I, RALPH L. FRASER, of Westernville, in the county of Oneida, and State of New York, have invented a new and improved Safety-Hook or Attachment for Round Driving-Reins or Straps; and I do hereby declare that the following is a full and exact description thereof, reference being had to the accompanying drawings, in which—

Like letters indicate corresponding parts in the different figures.

Figure 1:
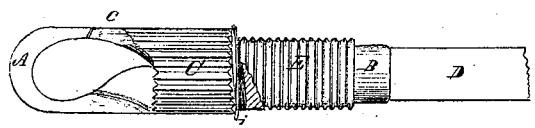
Figure 1 is a side view of the hook closed, a portion being represented in section to shown the spring $i$ and slot.
Figure 2:
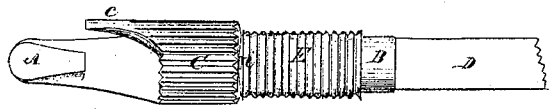
Figure 2 is a front view of the hook, shown open.
Figure 3:
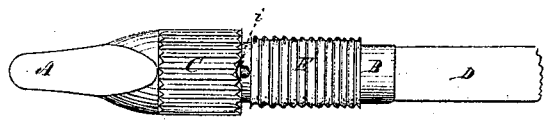
Figure 3 is a back view of the same closed.

My improved hook is designed especially for round driving-reins, as a means of attachment to the ring of the bit, and for other similar uses where a rein or line of round form is used; and It consists essentially of a shank of cylindrical form, and preferably tubular, to receive the rein, and a hook of suitable form and size, and a revolving sleeve, fitting over said cylinder, having an arm or point, which is coincident with the end of the hook at one position, and a spring arranged to maintain it in that position, except when forcibly removed.

In the drawings—

A is the hook;

B, the cylindrical shank; and

C, the revolving sleeve, with arm $c$; while $i$ indicates the spring, bearing against the outer end of the sleeve, at a point diametrically opposite to the arm $c$, where it is slightly notched or recessed, leaving an incline at either side thereof. As the spring rests in this notch or recess when the hook is closed, its pressure retains it in that position; but when it is required to open the hook, a little force applied causes the sleeve to rotate, by the yielding of the spring against the inclines.

The rein is inserted within the hollow cylindrical portion B, and secured by riveting through. I prefer to enclose this sleeve-portion of the hook in a ferrule, E, which serves as a protection to the spring, and also to graduate the contour from the larger diameter to the shank. This ferrule may be corrugated, as shown, or otherwise ornamented, and plated or gilt on the better class of harness.

The cylinder C is also preferably corrugated or fluted longitudinally of its direction, which enables it to be more easily turned by the hand, as well as improves its appearance.

The spring $i$ may be of the shape represented, or of any other form that will maintain sufficient pressure to hold the sleeve in the position required to keep the hook closed.

The form of this hook is very neat for use upon round reins, while it is strong, durable, and entirely safe from becoming disconnected while in use.

What I claim as my invention, and desire to secure by Letters Patent, is—

The rotating sleeve C, formed with arm $c$, and encircling the cylindrical shank B, in combination with said shank and the hook A, cast therewith, and the retaining-spring $i$, when the parts are constructed and adapted to operate together, substantially as described.

In witness whereof, I have hereunto signed my name, in the presence of two subscribing witnesses.

RALPH L. FRASER.

Witnesses:
ERASTUS ELY,
A. E. BUSSEY.